(12) United States Patent
Sturm

(10) Patent No.: US 6,503,167 B1
(45) Date of Patent: Jan. 7, 2003

(54) EXTERNALLY ACTUATED LOCKING DIFFERENTIAL ASSEMBLY

(75) Inventor: Gary L. Sturm, Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 49 days.

(21) Appl. No.: 09/670,810

(22) Filed: Sep. 28, 2000

(51) Int. Cl.[7] .............................................. F16H 48/30
(52) U.S. Cl. ........................ 475/231; 192/84.6; 192/94
(58) Field of Search .................................. 475/231, 230, 475/248, 249, 150; 192/84.6, 94

(56) References Cited

U.S. PATENT DOCUMENTS

| | | | |
|---|---|---|---|
| 4,679,463 A | * | 7/1987 | Ozaki et al. ................. 475/231 |
| 4,805,486 A | | 2/1989 | Hagiwara et al. |
| 4,838,118 A | * | 6/1989 | Binkley ....................... 475/231 |
| 4,895,236 A | | 1/1990 | Sakakibara et al. |
| 4,976,347 A | | 12/1990 | Sakakibara et al. |
| 5,019,021 A | * | 5/1991 | Janson ........................ 475/231 |
| 5,199,325 A | | 4/1993 | Reuter et al. |
| 5,267,635 A | * | 12/1993 | Peterson et al. ........... 192/94 X |
| 5,279,401 A | * | 1/1994 | Stall ............................ 475/231 |
| 5,299,986 A | * | 4/1994 | Fabris et al. ............. 475/231 X |

FOREIGN PATENT DOCUMENTS

| JP | 406017843 | * | 1/1994 | .................. 192/94 |
|---|---|---|---|---|

* cited by examiner

Primary Examiner—Charles A Marmor
Assistant Examiner—Ha Ho
(74) Attorney, Agent, or Firm—Liniak, Berenato & White

(57) ABSTRACT

An electronically controlled locking differential assembly including a friction clutch assembly provided within a differential case for selectively restricting differential action. The friction clutch assembly is actuated by a selectively controllable actuator including an electrical motor externally mounted to an axle housing, a reduction gearing and a drive screw adapted to axially displace a pusher block when the drive motor is actuated. The pusher block is integrally secured to a clutch actuating sleeve adapted to slide within a differential case trunnion coaxially to the side gear. The actuating sleeve is provided to apply a clutch loading force to an actuator plate. When the drive motor is actuated by a signal from a control unit, the rotary motion of the drive screw is transmitted to the actuator plate via the pusher block and the actuating sleeve, thereby actuating the friction clutch assembly and locking the differential.

14 Claims, 3 Drawing Sheets

EXTERNALLY ACTUATED LOCKING DIFFERENTIAL ASSEMBLY

BACKGROUND OF THE INVENTION

1. Field of the Invention

The present invention relates to a differential assembly, and more particularly to a locking differential assembly for motor vehicles, having an electro-mechanically externally actuated friction clutch assembly.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Conventional differentials include a differential case defining a gear chamber, and disposed therein, a differential gear set including at least one input pinion gear, and a pair of output side gears non-rotatably coupled to corresponding axle shafts. Such a device essentially distributes the torque provided by the input shaft between the output shafts. However, this type of differentials known in the art as an open differentials, i.e. a differential where movements of its various internal components are not restricted in any significant fashion, is unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential which limits the differential rotation between the output shafts to provide traction on slippery surfaces is well known.

Prior methods of limiting slippage between the side gears and the differential case usually employ a frictional clutch mechanism typically disposed between at least one of the side gears and an adjacent surface of the gear case, such that the clutch pack is operable to limit relative rotation between the gear case and the one side gear. A number of methods have been developed to limit wheel slippage under such conditions.

Limited slip differentials conventionally use the frictional clutch mechanism and a bias mechanism, usually a spring, to apply an initial preload between the frictional clutch mechanism and the differential casing. However, such preloaded clutches are usually always engaged, and thus are susceptible to wear, causing undesirable repair and replacement costs. Also, such a preloaded clutch mechanism may lock the output shafts together in situations where differential rotation is necessary.

Another method of limiting slippage involves the use of a selectively controllable frictional clutch mechanism as a differential locking device actuated manually by a vehicle operator or by a signal from an appropriate electronic control unit, to restrict the movements of the internal components of the differential. The frictional clutch mechanism may be actuated by various hydraulic or electromagnetic mechanisms, which conventionally constructed of elements disposed inside the differential casing. However, the locking differentials occupy bigger space and are often quite complex, cumbersome and expansive to manufacture.

Thus, there is a need for a lockable differential that is simple, compact and inexpensive to manufacture.

SUMMARY OF THE INVENTION

The present invention provides an improved electronically controlled locking differential assembly having an externally actuated friction clutch assembly.

The differential assembly in accordance with the preferred embodiment of the present invention includes a rotatable differential case forming a housing, a differential gearing rotatably supported in the case, and a pair of opposite side gears in meshing engagement with the differential gearing to permit differential rotation thereof. The differential assembly includes a friction disk clutch assembly disposed within the differential case and provided to lock the differential assembly. The friction clutch assembly includes a number of alternating outer friction plates non-rotatably coupled to the differential case and inner friction plates splined to one of the side gears. An annular actuator plate is arranged within the differential case between the friction clutch assembly and an adjacent surface of the differential case, and is adapted to axially reciprocate within the case for loading the friction clutch plates. An electronic selectively controllable actuator assembly is provided for axially displacing the actuator plate in order to load the friction assembly when needed, thus providing the differential assembly with a locking function. The actuator assembly comprises an electric motor mounted to an axle housing and provided for rotating a drive screw via a gear reducer. In turn, the drive screw axially drives a clutch actuating sleeve through a complimentary threaded pusher block. The clutch actuating sleeve is provided coaxially to the side gear to apply an axial force to the actuator plate in order to compress and, thus, actuate the friction clutch assembly.

Therefore, the locking differential assembly in accordance with the present invention provides a simple, compact and inexpensive locking differential assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
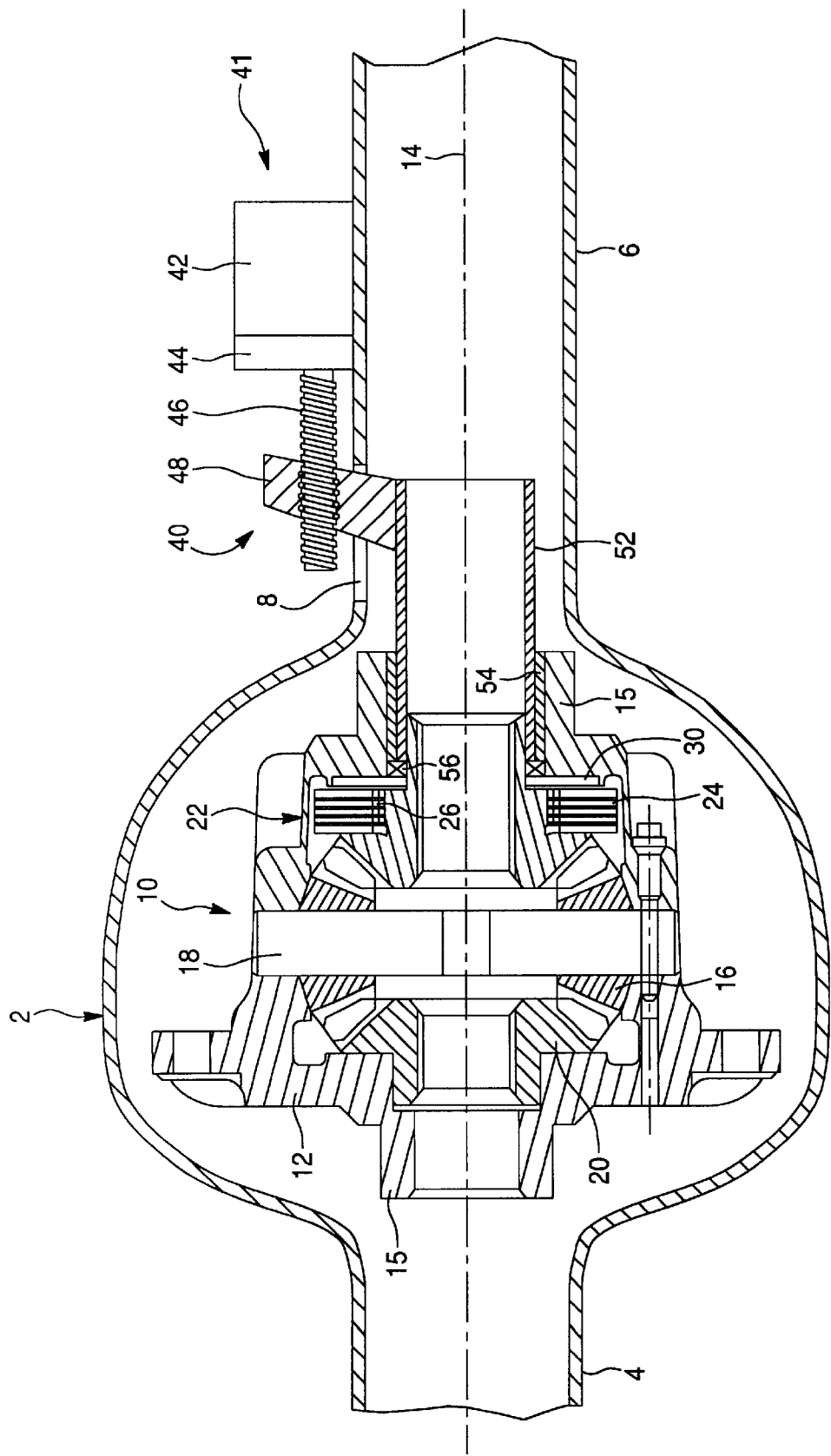
FIG. 1 is a sectional side view of a locking differential assembly in accordance with a first embodiment of a present invention.
Figure 2:
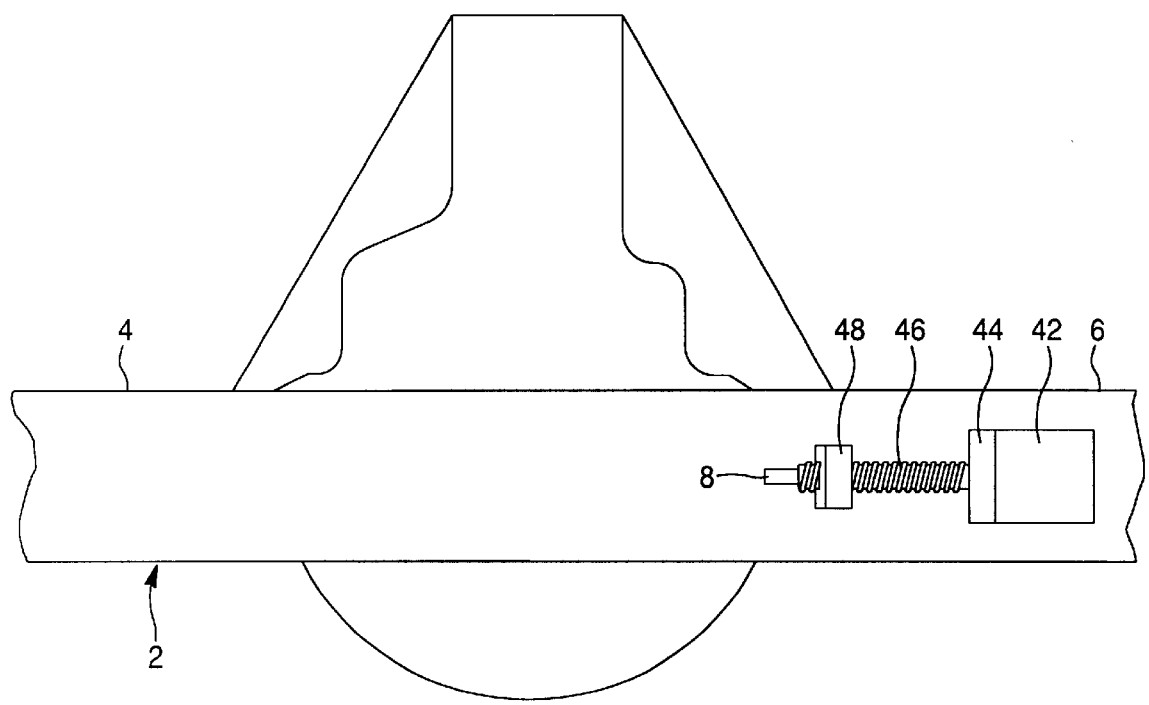
FIG. 2 is a top view of the locking differential assembly of the present invention.

FIGS. 1 and 2 of the drawings illustrate in detail the preferred arrangement of the differential assembly 10 in accordance with the present invention. Reference numeral 12 defines a differential case rotatably supported in an axle housing 2 trough roller bearings (not shown), and defines an axis of rotation 14. The axle housing 2 has left and right axle shaft tubes 4 and 6 respectively, projecting coaxially from opposite sides.

The differential assembly 10 is provided with a set of pinion gears 16 rotatably supported on a pinion shaft 18 secured to the differential case 12. The pinion gears 16 engage a pair of opposite side gears 20 adapted to rotate about the axis 14. The side gears 20 are splined to output axle shafts (not shown) extending through a pair of opposite trunions 15 formed with the differential case 12.

A friction clutch assembly 22 is provided within the differential case 12. The friction clutch assembly 22, well known in the prior art, includes sets of alternating outer friction plates 24 and inner friction plates 26. Conventionally, an outer circumference of the outer friction plates 24 is provided with projections that non-rotatably engages corresponding grooves 28 formed in the differential case 12. At the same time, the outer friction plates 24 are slideable in axial direction. The inner friction plates 26 are splined to the side gear 20 so that the inner friction clutch plates 26 are non-rotatably, but axially slidably mounted on the side gear 20.

An annular actuator plate 30 is provided to axially load the friction clutch plates 24 and 26 in order to actuate the friction clutch assembly 22. When the friction clutch assembly 22 is actuated, it completely restricts the movement of internal components of the differential, thereby providing full torque from the engine to both driving wheels.

As further illustrated in FIGS. 1 and 2, in order to selectively actuate the friction clutch assembly 22 when necessary, the differential assembly 10 further comprises a linear actuator assembly 40. The linear actuator assembly 40 includes a linear actuator motor 41 and a non-rotatable pusher block 48 coupled to the linear actuator motor 41 so that an actuating motion of the actuator motor 41 is transformed to a linear motion of pusher block 48. It will be appreciated that any types of appropriate linear motors that provide linear axial motion of the pusher block 48 are within the scope of the present invention.

The preferred embodiment of the actuator motor 41 comprises an electric servomotor 42 mounted to an exterior surface of the axle housing 2. Alternatively, hydraulic or pneumatic rotary motors may be employed instead of the electric motor. The servomotor 42 drives a drive screw 46 via a gear reducer 44. The electric motor 42 and the gear reducer 44 are mounted outside the differential case 12 to the axle housing 2, preferably to the axle tube 6.

The drive screw 46 is provided, preferably, with an acme screw thread. The drive screw 46 is partially disposed in the pusher block 48 provided with a thread that complements the thread in the drive screw 46. As a result rotation of the drive screw 46 causes corresponding axial movement of the pusher block 48 between a retracted position and an extended position.

Figure 3:
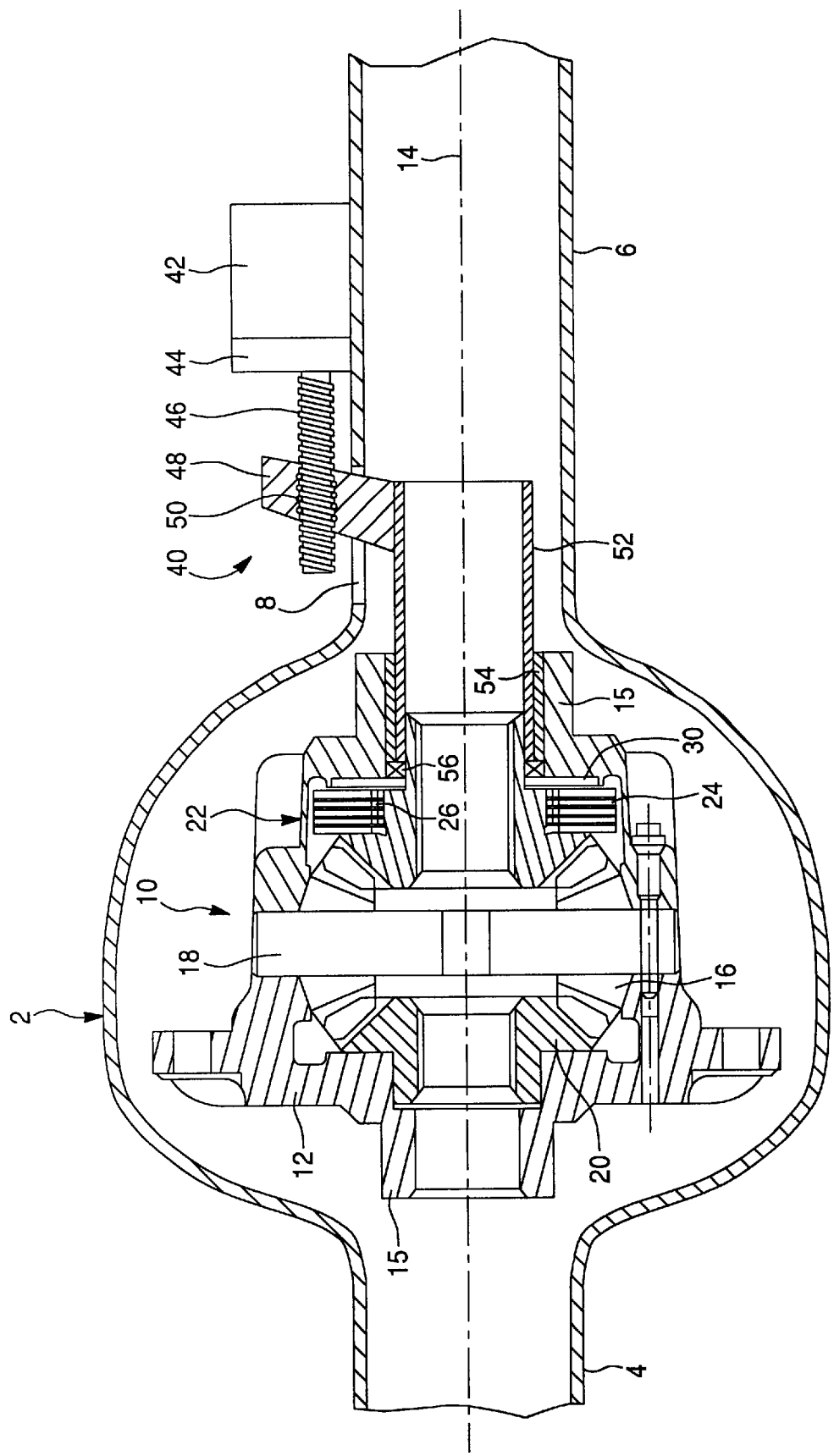
FIG. 3 is a sectional side view of the locking differential assembly in accordance with a second embodiment of the present invention.

It will be appreciated that any other appropriate types of the screw drives may be employed, such as helically grooved ball screws, as illustrated in FIG. 3. FIG. 3 shows a helically grooved ball screw 46' disposed in a pusher block 48' and an inner portion of the pusher block 48' is provided with a helical groove that complements the groove in the ball screw 46' so as to receive a plurality of balls 50. As a result rotation of the ball screw 46' causes corresponding axial movement of the pusher block 48'.

Alternatively, other types of the linear actuator motor 41 may be employed, such as hydraulic or pneumatic power cylinders, electromagnetic linear actuator, and a manual linear actuator actuated by a vehicle operator.

The pusher block 48 is axially slideable but rotary constrained, so that the rotational motion of the drive screw 46 is transformed to the linear motion of the pusher block 48.

Furthermore, the preferred embodiment of the actuator assembly 40 of the present invention includes a clutch actuating sleeve 52 disposed at least partially within the trunnion 15 coaxially to the axis 14. The actuating sleeve 52 is secured to the pusher block 48 by welding or any other appropriate means well known in the prior art. Alternatively, the pusher block 48 and the actuating sleeve 52 may be manufactured as an integral single-piece part. The pusher block 48 is extending between the drive screw 46 and the actuating sleeve 52 through an elongated slot 8 in the axle tube 6. Such an arrangement allows axial displacement of the pusher block, but prevents rotation thereof. A sleeve bearing 54 press-fitted within the trunnion 15 is employed to guide the actuating sleeve 52.

The actuating sleeve 52 is provided to apply an axial force to the annular actuator plate 30 in order to load the friction clutch assembly 22. An axial thrust bearing 56 is provided between the actuator plate 30 and the actuating sleeve 52 to reduce the friction because the actuator plate 30 rotates with the side gear 20.

With the arrangement of the locking differential assembly 10 described above, when the motor 42 is actuated by a signal from any appropriate control unit (not shown), the gear reducer 44 rotates the drive screw 46. The rotary motion of the drive screw 46 is transmitted to the pusher block 48 which travels linearly along the drive screw 46 leftward in FIG. 1 from the retracted position and the extended position. The linear axial motion of the pusher block 48 is transmitted to the actuator plate 30 via the actuating sleeve 52 thereby to compress the friction clutch plates 24 and 26 in order to actuate the friction clutch assembly 22 and lock the differential assembly 10.

Therefore, the externally actuated differential assembly in accordance with the present invention represents a novel arrangement of the locking differential assembly that is simple, compact and inexpensive in manufacturing.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A locking differential assembly comprising:

an axle housing;

a differential case rotatably supported in said axle housing and defining an axis of rotation;

two opposite output shafts extending from said differential case and rotatable about said axis relative to said differential case;

two side gears arranged coaxially and rotatable relative to said differential case, and non-rotatably coupled to the respective output shafts;

differential gears rotatably supported by said differential case and drivingly engaging said side gears to allow differential rotation thereof;

a friction clutch assembly including a number of alternating inner friction plates non-rotatably coupled to said side gear, and outer friction plates non-rotatably coupled to said differential case;

a linear actuator assembly; and a clutch actuating sleeve arranged coaxially to said side gear and drivingly coupled to said linear actuator for axially moving said actuator sleeve within said differential case for axially compressing said friction clutch plates to actuate said friction clutch assembly, wherein said linear actuator assembly including:
  a linear actuator motor; and
  a non-rotatable pusher block coupled to said linear actuator motor so that an actuating motion of said actuator motor being transformed to a linear motion of said pusher block;
  said pusher block fixed to said clutch actuating sleeve.

2. The locking differential assembly as defined in claim 1, wherein said linear actuator motor is chosen from a group consisting of a rotary drive motor and drive screw combination, a pneumatic linear actuator, a hydraulic linear actuator, an electromagnetic linear actuator and a manual actuator.

3. The locking differential assembly as defined in claim 1, wherein said linear actuator motor is mounted to said axle housing.

4. The locking differential assembly as defined in claim 1, further comprising an annular actuator plate for pressing said friction plates, said actuator plate arranged coaxially to one of said side gears and provided intermediate to said friction clutch assembly and said clutch actuating sleeve.

5. The locking differential assembly as defined in claim 3, wherein said pusher block is extending through an elongated slot in said axle housing.

6. A locking differential assembly comprising:

an axle housing;

a differential case rotatably supported in said axle housing and defining an axis of rotation;

two opposite output shafts extending from said differential case and rotatable about said axis relative to said differential case;

two side gears arranged coaxially and rotatable relative to said differential case, and non-rotatably coupled to the respective output shafts;

differential gears rotatably supported by said differential case and drivingly engaging said side gears to allow differential rotation thereof;

a friction clutch assembly including a number of alternating inner friction plates non-rotatably coupled to said side gear, and outer friction plates non-rotatably coupled to said a linear actuator assembly; and a clutch actuating sleeve arranged coaxially to said side gear and drivingly coupled to said linear actuator assembly for axially moving said actuator sleeve within said differential case for axially compressing said friction clutch plates to actuate said friction clutch assembly, wherein said linear actuator assembly including:
  a rotary drive motor having an output shaft;
  a drive screw drivingly connected to said output shaft; and
  a non-rotatable pusher block being in threaded engagement with said drive screw so that a rotational motion of said drive screw being transformed to a linear motion of said pusher block;
  said pusher block fixed to said clutch actuating sleeve.

7. The locking differential assembly as defined in claim 6, further comprising a gear reducer drivingly connecting said drive screw to said output shaft of said rotary motor.

8. The locking differential assembly as defined in claim 6, wherein said linear actuator assembly is mounted to said axle housing.

9. The locking differential assembly as defined in claim 6, wherein said rotary motor is mounted to said axle housing.

10. The locking differential assembly as defined in claim 6, wherein said rotary drive motor being one of an electric motor, hydraulic motor and a pneumatic motor.

11. The locking differential assembly as defined in claim 6, further comprising a ball-screw mechanism provided between said drive screw and said pusher block.

12. The locking differential assembly as defined in claim 9, wherein said pusher block is extending through an elongated slot in said axle housing.

13. A locking differential assembly, comprising:

an axle housing;

a differential case rotatably supported in said axle housing and defining an axis of rotation;

two opposite output shafts extending from said differential case and rotatable about said axis relative to said differential case;

two side gears arranged coaxially and rotatable relative to said differential case, and non-rotatably coupled to the respective output shafts;

differential gears rotatably supported by said differential case and drivingly engaging said side gears to allow differential rotation thereof;

a friction clutch assembly including a number of alternating inner friction plates non-rotatably coupled to said side gear, and outer friction plates non-rotatably coupled to said differential case;

an electric motor mounted to said axle housing, said motor having an output shaft;

a drive screw drivingly connected to said output shaft;

a non-rotatable pusher block being in threaded engagement with said drive screw so that a rotational motion of said drive screw being transformed to a linear motion of said pusher block, said pusher block extending through an elongated slot in said axle housing; and a clutch actuating sleeve arranged coaxially to said side gear and drivingly coupled to said output shaft of said drive motor, said actuator sleeve provided for axially compressing said friction clutch assembly to cause a frictional restriction of said differential rotation of said side gear.

14. The locking differential assembly as defined in claim 13, further comprising a ball-screw mechanism provided between said drive screw and said pusher block.

* * * * *